(12) United States Patent  
Tahira et al.

(10) Patent No.: US 6,600,697 B2  
(45) Date of Patent: Jul. 29, 2003

(54) MAGNETIC HEAD AND MAGNETIC HEAD ASSEMBLY USING THE SAME

(75) Inventors: Toshio Tahira, Tenri (JP); Seiichi Nagatome, Tenri (JP); Tomoyuki Miyake, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 296 days.

(21) Appl. No.: 09/779,733

(22) Filed: Feb. 9, 2001

(65) Prior Publication Data

US 2001/0014057 A1 Aug. 16, 2001

(30) Foreign Application Priority Data

Feb. 10, 2000 (JP) ........................................ 2000-034171

(51) Int. Cl.[7] ............................................. G11B 11/00
(52) U.S. Cl. .................................................. 369/13.17
(58) Field of Search ........................... 369/13.17, 13.18, 369/13.22, 13.33; 360/236.2, 236.9, 265.7, 265.8, 266.7, 266.8, 266.9, 246.2

(56) References Cited

U.S. PATENT DOCUMENTS

| | | | | |
|---|---|---|---|---|
| 5,361,242 A | * | 11/1994 | Chaya et al. | 369/13 |
| 5,367,508 A | * | 11/1994 | Haba | 369/13 |
| 5,572,490 A | * | 11/1996 | Kazama | 369/13 |
| 5,615,183 A | * | 3/1997 | Ishii | 369/13 |
| 5,627,804 A | * | 5/1997 | Ishii | 369/13 |
| 6,314,060 B1 | * | 11/2001 | Ishii | 369/13 |
| 6,526,001 B1 | * | 2/2003 | Miyake et al. | 369/13.17 |

FOREIGN PATENT DOCUMENTS

| | | |
|---|---|---|
| JP | 10124802 | 5/1998 |
| JP | 2936782 | 6/1999 |

* cited by examiner

*Primary Examiner*—Tan Dinh  
(74) *Attorney, Agent, or Firm*—Birch, Stewart, Kolasch & Birch, LLP

(57) ABSTRACT

The magnetic head of the present invention includes a magnetic body in the form of a flat plate, and a magnetic pole in the form of a pillar for applying a magnetic field to a recording medium, which is provided to rise on a portion of the magnetic body which is offset in one direction from a center of the magnetic body, and is provided with a coil around its outer periphery. Thus, the magnetic head has a core of a raised shape which is composed of the pillar-shaped magnetic pole being attached to the magnetic body in the form of a flat plate, making it possible to provide a heat capacity and a heat radiation area required for the core and the magnetic body, respectively, thus adapting to high frequencies. Further, because the magnetic pole is provided on a position which is offset in one direction from the center of the magnetic body, there will be no interference between the magnetic head and the cartridge or mechanical components even when the size of the core is increased due to the core of the raised shape. As a result, less restriction is imposed on a moving range of the magnetic head, thus using the entire recording area of the recording medium.

4 Claims, 14 Drawing Sheets

MAGNETIC HEAD AND MAGNETIC HEAD ASSEMBLY USING THE SAME

FIELD OF THE INVENTION

The present invention relates to a magnetic head for performing recording such as magneto-optical recording by applying a modulation magnetic field while increasing the temperature of a recording site, and also to a magnetic head assembly using such a magnetic head, and in particular, to a configuration of its magnetic pole.

BACKGROUND OF THE INVENTION

FIG. 8 is a perspective view showing a structure of a typical conventional magnetic head 1. The magnetic head 1 is a magnetic head for use in mini-disc ("MD" hereinafter) devices which employ magneto-optical recording. The magnetic head 1 has a structure, wherein, schematically, a coil 4 is wound around a central magnetic pole 3 of a E-shape core 2. The E-shape core 2 has an integral structure composed of the central magnetic pole 3 in the form of a pillar and a yolk portion 5 for enhancing the strength of a generated magnetic field, which are made of a magnetic material such as Mn—Zn ferrite. The coil 4 is made of an insulating material, and is fastened on the E-shape core 2 by being wound around a bobbin (not shown), which is then fitted to the central magnetic pole 3.

FIG. 9 shows a magnetic head assembly 11 employing the foregoing magnetic head 1, as viewed from the recording medium side. The magnetic head 1 is fastened on a slider 12 made of a slidable material. The slider 12 has a sliding part 13 which slides on the recording medium and holds the magnetic head 1 alone or in pair (in pair in FIG. 9) in a direction orthogonal to a sliding direction with respect to the recording medium, and is fastened on one end of a suspension 15 (mentioned later) by a link portion 14.

The sliding part 13 is formed by molding, for example, a polymer material such as polyarylate, nylon, and polyester, or a material having a low friction coefficient such as ceramic. Alternatively, the sliding part 13 may be made of other materials, and a material having a low friction coefficient in the form of a tape may be stuck to a portion which comes into contact with the recording medium.

The magnetic head 1 and the slider 12 are slidable in response to deflection of the recording medium, or dusts or protrusions, etc., on the recording medium. Thus, the magnetic head 1 and the slider 12 are normally supported under a pre-load of 3 mN to 10 mN by the suspension 15 which is made of a thin metal having a thickness in a range of 30 $\mu$m to 100 $\mu$m. The other end of the suspension 15 is supported by a fixing section.

In addition to the magnetic head 1, the slider 12, and the suspension 15, there is provided an upper regulating plate (not shown) to make up the magnetic head assembly 11. The upper regulating plate is provided to prevent any damage to the magnetic head 1, which may be caused by a collision between the magnetic head 1 and the outer casing due to vibrations, etc., on the entire device, or between the magnetic head 1 and the recording medium due to reaction to such vibrations.

FIG. 10 and FIG. 11 are a plan view and a cross sectional view, respectively, explaining how recording is carried out. A recording medium 21 is encased in a cartridge 22 for protection against damage or dusts, etc. The cartridge 22 has openings 23 and 24 of a near-rectangular shape respectively on the upper and lower sides thereof. The openings 23 and 24 are closed by a shutter (not shown) when the cartridge 22 is outside of the device.

When recording, a front end of the magnetic head assembly 11 moves into the cartridge 22 from the opening 23, and the sliding part 13 of the slider 12 comes into contact with the recording medium 21. As mentioned above, MDs employ magnetic modulation recording, and thus there is provided a light pick-up 25 directed to the recording medium 21 through the opening 24, on the opposite side of the magnetic head 1 with the magnetic medium 21 in between. The light pick-up 25 is displaceable in a radial direction of the recording medium 21 in an interlocked manner with the magnetic head 1. A portion irradiated with a laser beam from the light pick-up 25 becomes a recording site. Signals are recorded only on the recording site by the modulation magnetic field applied in the vicinity of the recording site by the magnetic head 1.

The described structure is called a sliding magnetic head and has currently been used commonly in MD devices. Meanwhile, in recent years, the MD devices have been marketed as applied to other applications such as digital still cameras, and further the MD devices are beginning to be used to record music data which have been distributed via networks. In these applications, by increasing the frequency of the modulation signal through the coil 4, the picture interval can be shortened and the image quality can be improved in digital still cameras, and the time of receiving music data can be reduced. Thus, there has been demand for increasing the currently used frequency of, for example, 720 kHz to the frequency of 10 MHz or greater.

However, when the frequency of the current through the coil 4 is increased, a core loss (hysteresis loss, overcurrent loss, etc.) by the core 2 increases abruptly, which results in significant increase in calorific value of the core 2. Further, when the temperature of the core 2 itself is increased, there were cases where the magnetic head 1 and the peripheral circuits were damaged as the temperature exceeded past the Curie point of the core material.

SUMMARY OF THE INVENTION

It is an object of the present invention to provide a magnetic head which can adapt to high frequencies while using the entire recording area of the recording medium, and a magnetic head assembly using the same.

In order to achieve this object, a magnetic head in accordance with the present invention is for applying a magnetic field for recording and erasing information to a temperature-increased recording site of a recording medium, and includes: a magnetic pole in the form of a pillar; a coil which is wound around the magnetic pole; and a magnetic body in the form of a flat plate to which one end of the magnetic pole is fastened, the magnetic body being formed asymmetrical about a relative displacement direction of the recording medium with respect to a portion where the magnetic pole is fastened.

According to this arrangement, the magnetic head is adapted to high frequencies by the provision of a core of a raised type composed of the magnetic pole being provided to rise on the magnetic body in the form of a flat plate, which provides a heat capacity which is required for the core and a heat radiation area which is required for the magnetic body, wherein the magnetic body is formed asymmetrical about a relative displacement direction of the recording medium.

Thus, by determining the shape of the magnetic body in accordance with the cartridge which encases the recording medium, or the mechanical components in the vicinity of the magnetic head, there will be no interference between the magnetic head and the cartridge or the mechanical components, even when the size of the magnetic core is increased due to the magnetic core of the raised shape. As a result, less restriction is imposed on the moving range of the magnetic head, thus making it possible to use the entire recording area of the recording medium.

Meanwhile, the heat capacity and the heat radiation area required for the core are provided by the magnetic body in the form of a flat plate, and therefore there will be no problem due to heat capacity and heat radiation area, thereby adapting to high frequencies.

For a fuller understanding of the nature and advantages of the invention, reference should be made to the ensuing detailed description taken in conjunction with the accompanying drawings.

DESCRIPTION OF THE EMBODIMENTS

The present invention was made in view of and based on the invention which will be described in the following in relation to the descriptions of embodiments of the present invention.

Figure 12:
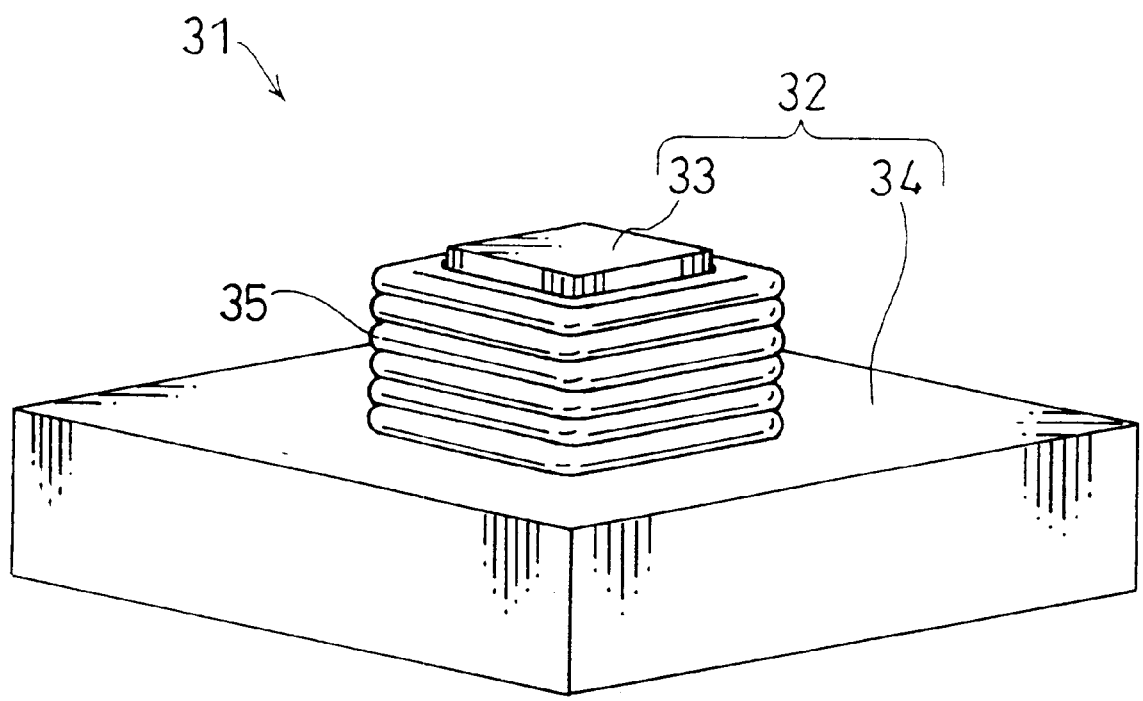
FIG. 12 is a perspective view showing a structure of another conventional magnetic head.

FIG. 12 is a perspective view showing a structure of a magnetic head 31. The magnetic head 31 is a magnetic head of a raised structure, wherein a magnetic core 32 includes a magnetic body 34 in the form of a flat plate which is attached to one end of a magnetic pole 33 in the form of a circular or rectangular pillar, and a coil 32 is wound around the magnetic pole 33.

The magnetic core 32 of the raised shape has an improved magnetic field generating efficiency compared with the conventional E-shape core 2, and thus is capable of suppressing calorific value and has improved heat radiation effect. Thus, given the magnetic field of the same strength, the calorific value can be decreased compared with the magnetic head 1 of the conventional E-shape core 2, so as to increase the frequency of the current flown through the coil 35, thus adapting to high-frequency recording.

Figure 13:
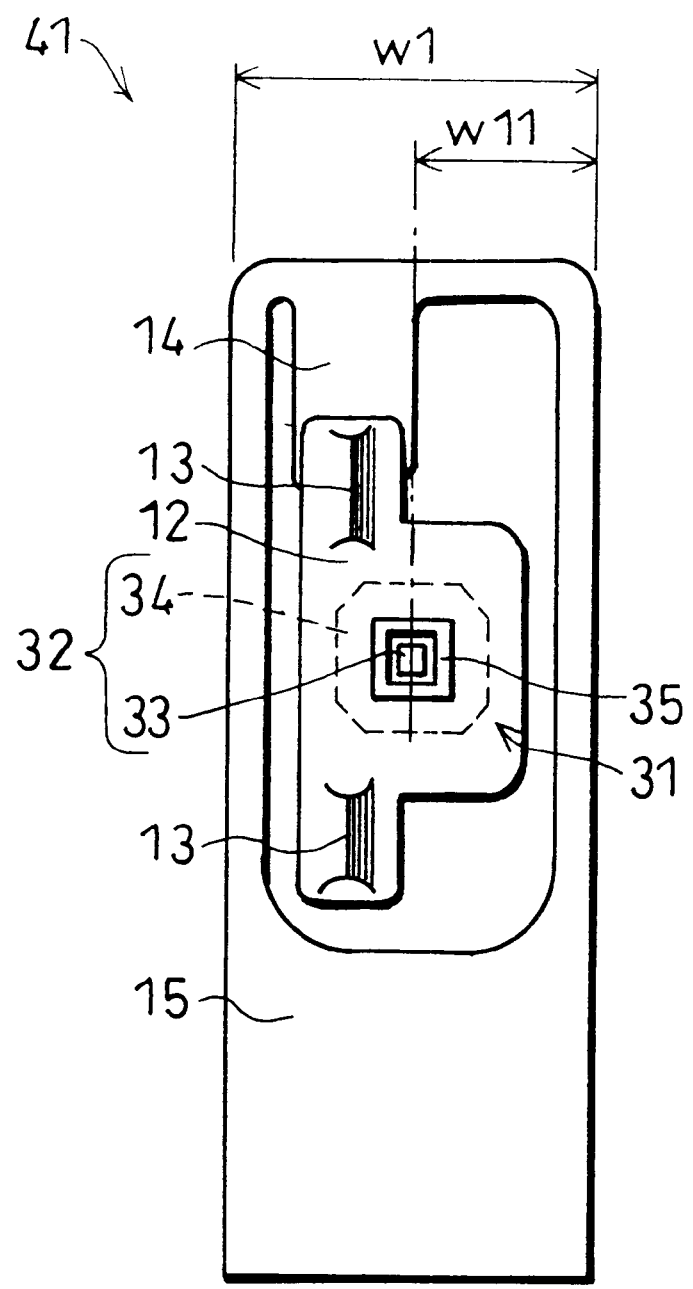
FIG. 13 is a drawing showing a magnetic head assembly employing the magnetic head of FIG. 12, as viewed from the recording medium side.

FIG. 13 shows a magnetic head assembly 41 employing the magnetic core 32 of the raised shape, as viewed from the recording medium side. The magnetic head assembly 41 is similar to the magnetic head assembly 11, and corresponding elements are given the same reference numerals and explanations thereof are omitted here. The material and method of forming a slider 12 are the same as the case of the E-shape core 2. Also, there is no notable difference in material and shape of the suspension 15 and the upper regulating plate from those used with the E-shape core 2.

Figure 9:
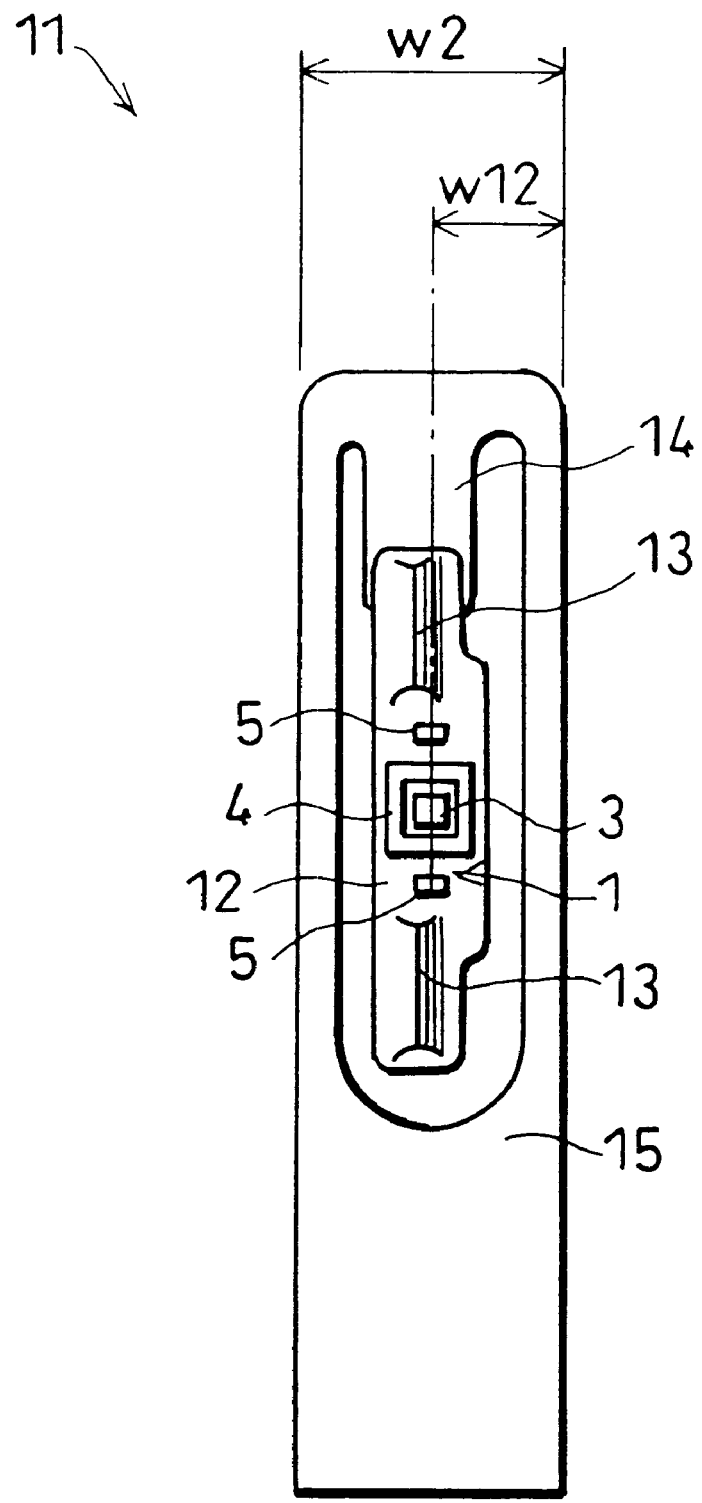
FIG. 9 is a drawing showing a magnetic head assembly employing the magnetic head of FIG. 8, as viewed from the recording medium side.
Figure 10:
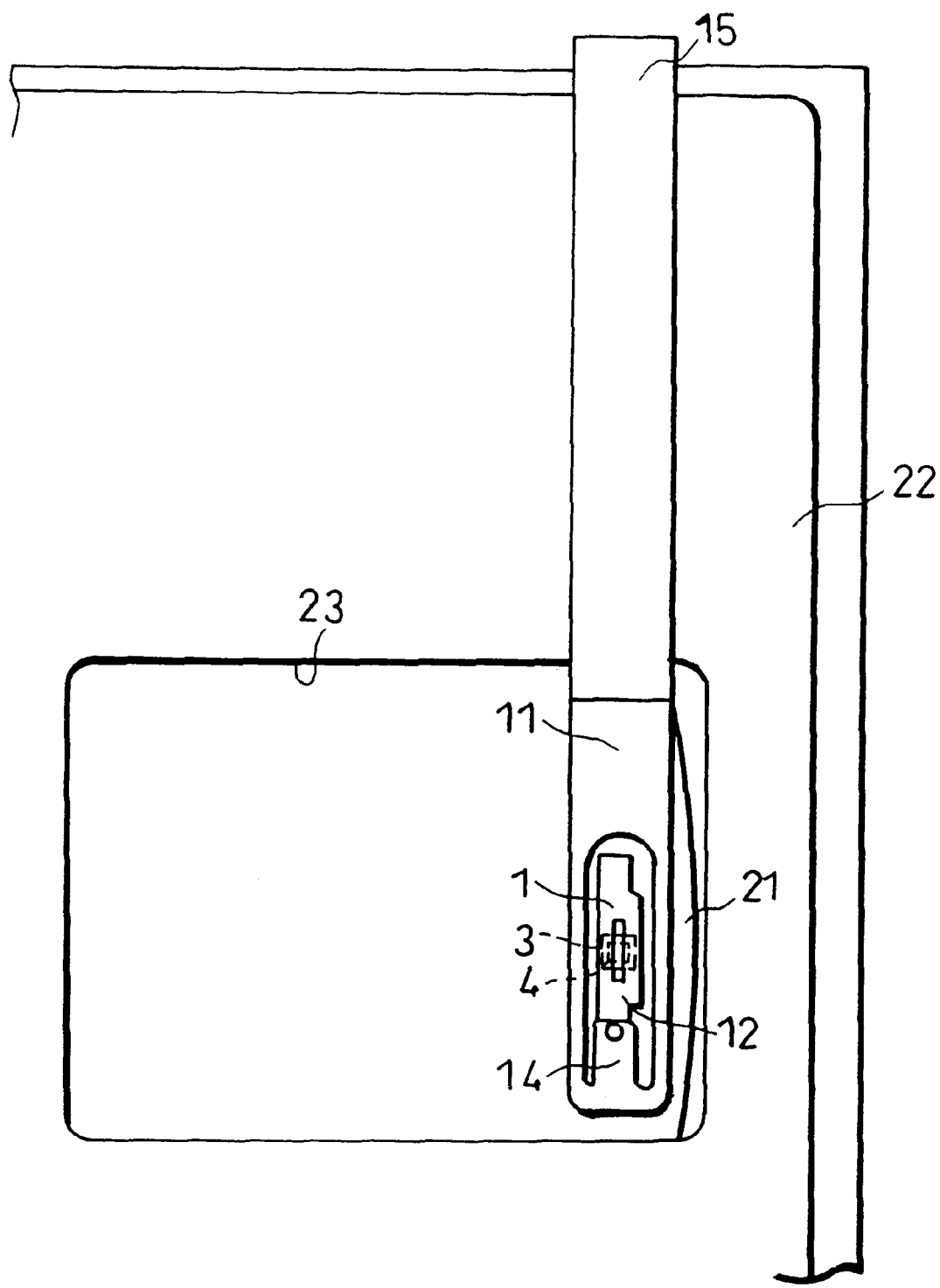
FIG. 10 is a plan view explaining how recording is carried out by the magnetic head assembly of FIG. 9.
Figure 11:
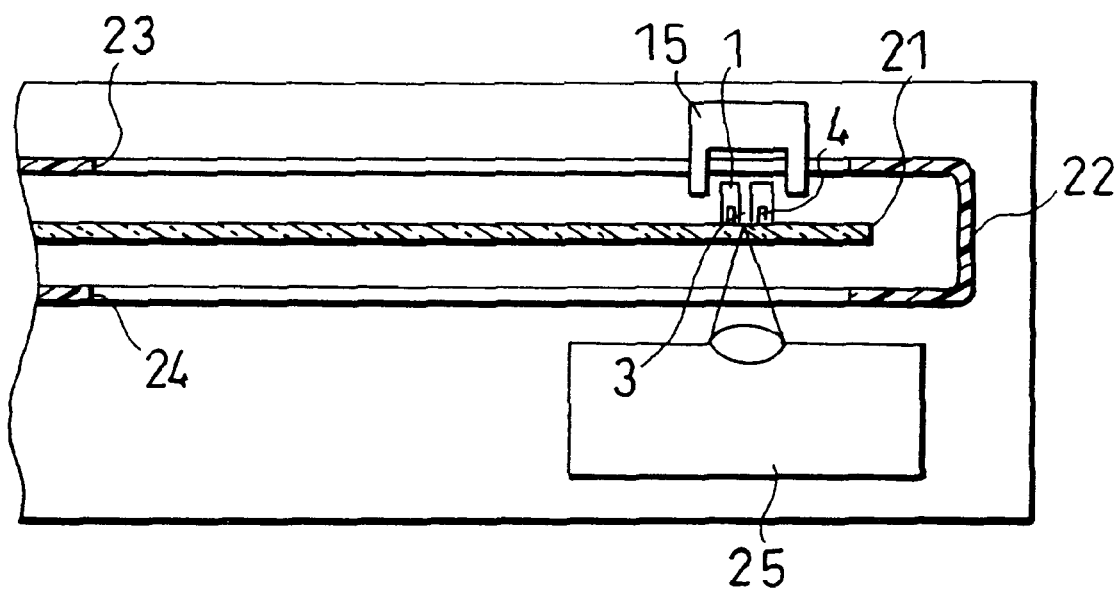
FIG. 11 is a cross sectional view explaining how recording is carried out by the magnetic head assembly of FIG. 9.
Figure 14:
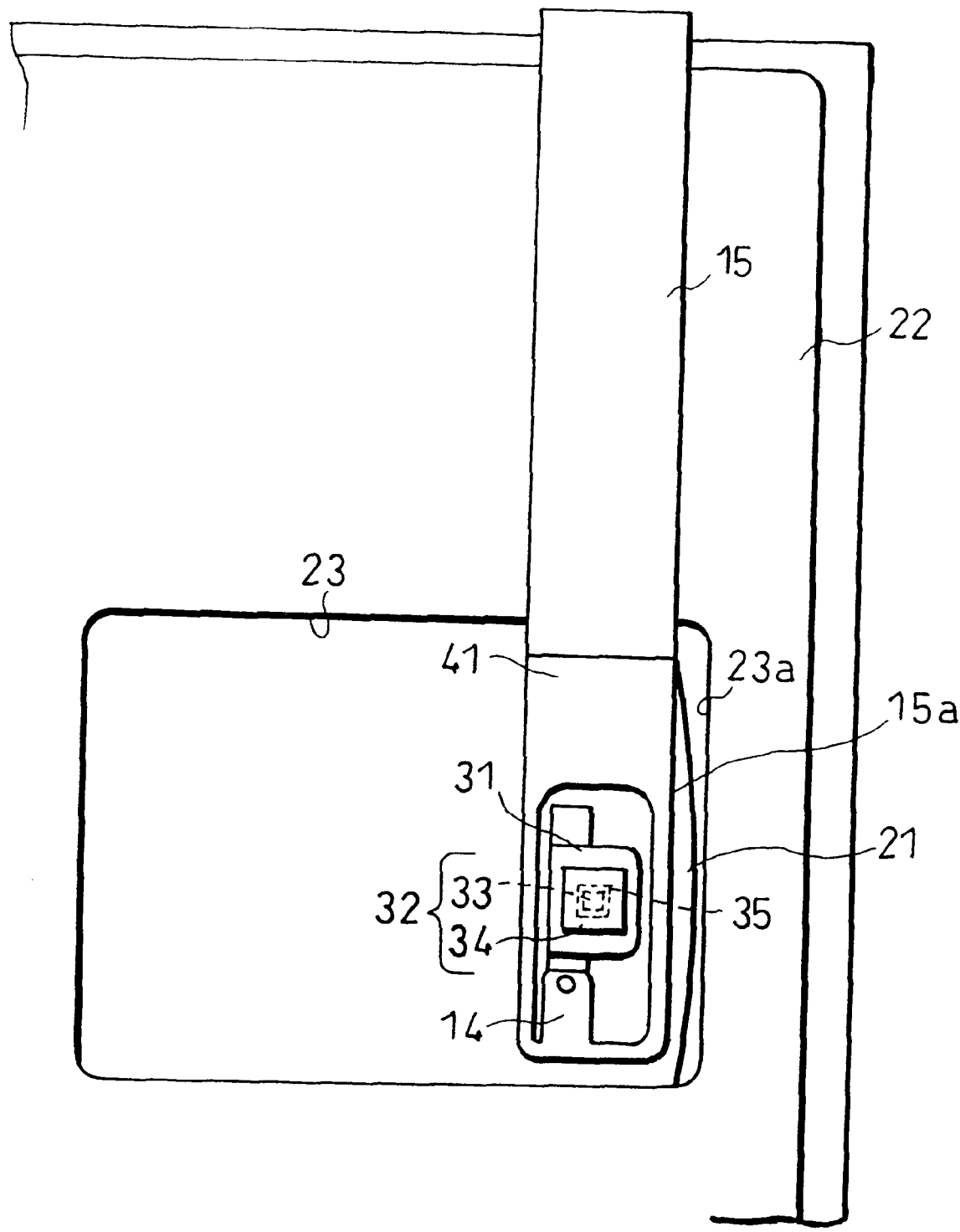
FIG. 14 is a plan view explaining how recording is carried out by the magnetic head assembly of FIG. 13.
Figure 15:
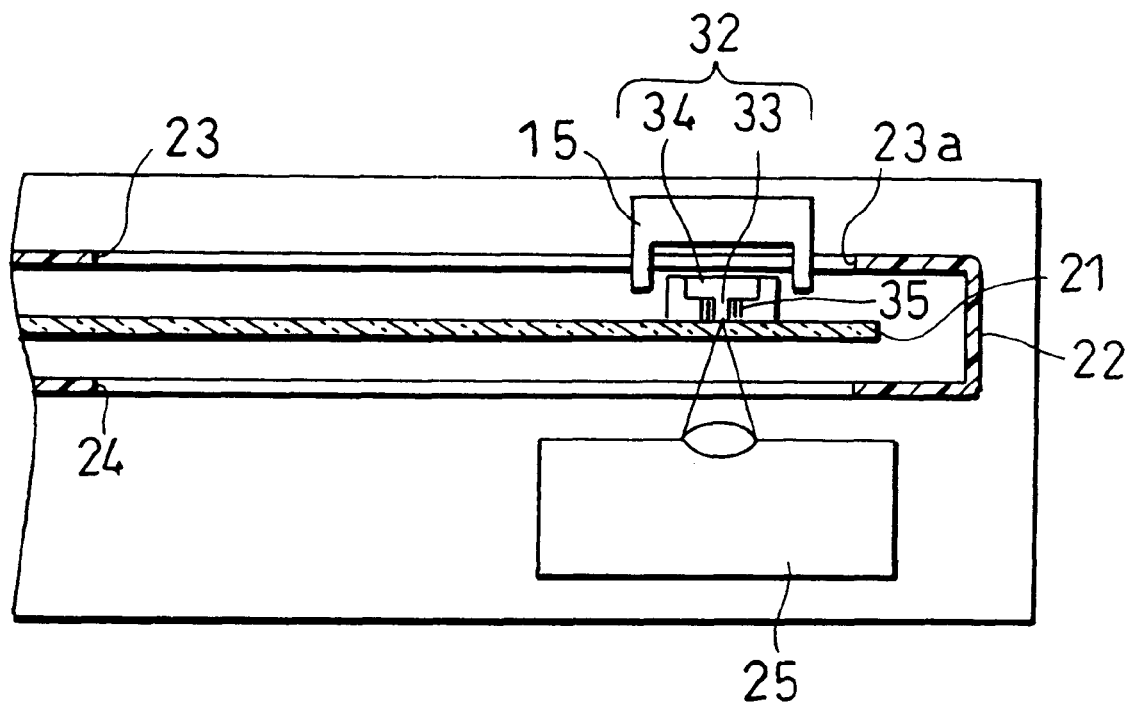
FIG. 15 is a cross sectional view explaining how recording is carried out by the magnetic head assembly of FIG. 13.

FIG. 14 and FIG. 15 are a plan view and a cross sectional view, respectively, explaining how recording is carried out by the magnetic head 31. Corresponding elements to FIG. 10 and FIG. 11 are given the same reference numerals. The magnetic head 31 has the magnetic core 32 of the raised shape, which is wider than the E-shape core for the purpose of improving the magnetic field generating efficiency and the heat radiation effect. Also, the weight of the magnetic head 31 and the slider 12 together is heavier, and the width of the suspension 15 is made wider. Thus, as shown in FIG. 13 and FIG. 9, the width w1 of the magnetic head assembly 41 in the radial direction of the recording medium 21 is wider than the width w2 of the magnetic head assembly 11. Therefore, when the magnetic head assembly 41 is moved outward in the radial direction of the recording medium 21, a peripheral wall portion 23a of the opening 23 interferes with a side surface 15a of the suspension 15, which makes the outward moving range of the central magnetic pole (center of the magnetic pole 33) of the magnetic head 31 in the radial direction of the recording medium 21 narrower than that of the magnetic head assembly 11 (FIG. 10). In particular, when a recording device equipped with the magnetic head assembly 11 is used in portable devices, the moving range is further restricted to avoid a collision with the peripheral wall portion 23a, which is caused by side deflection of the suspension 15.

This prevented using the outer periphery portion of the recording area, where a recording capacity per unit rotation angle is large, to its full extent, making the recording capacity smaller than the actual recording capacity as specified beforehand for the recording medium 21.

In view of this drawback, the present invention employs the following structure, which will now be described as one embodiment of the present invention with reference to FIG. 1 through FIG. 4.

Figure 1:
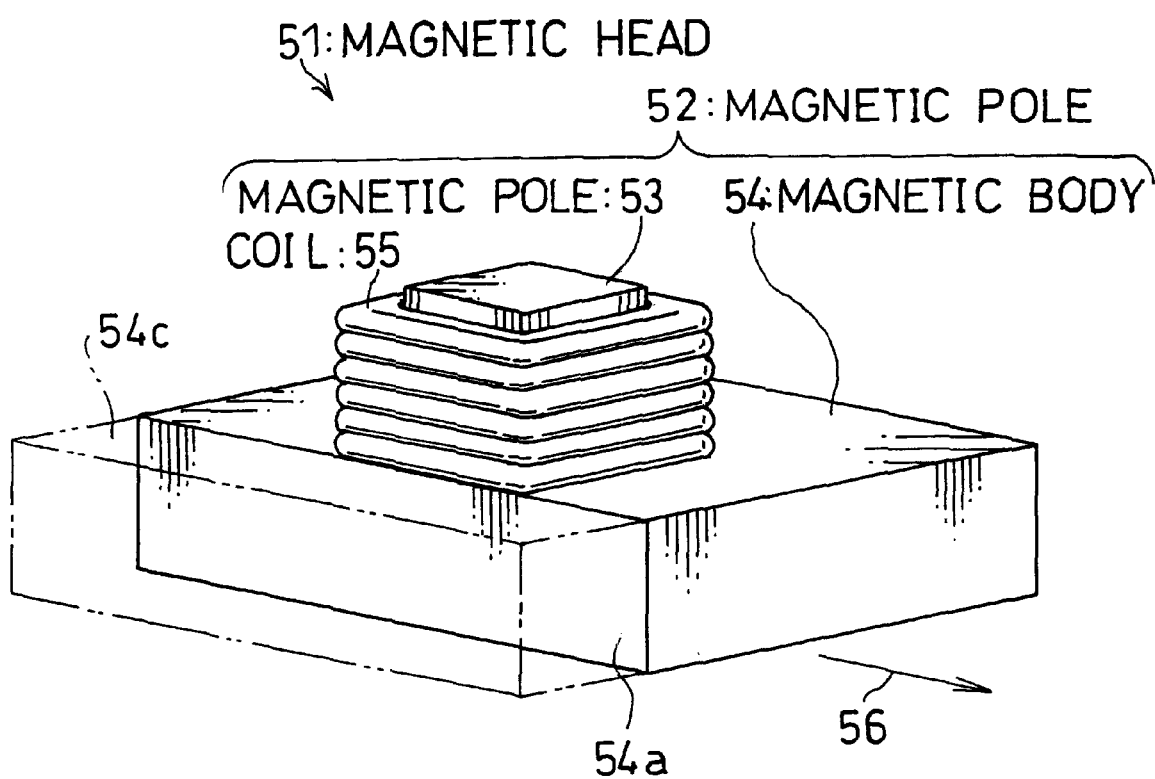
FIG. 1 is a perspective view showing a structure of a magnetic head in accordance with one embodiment of the present invention.
Figure 8:
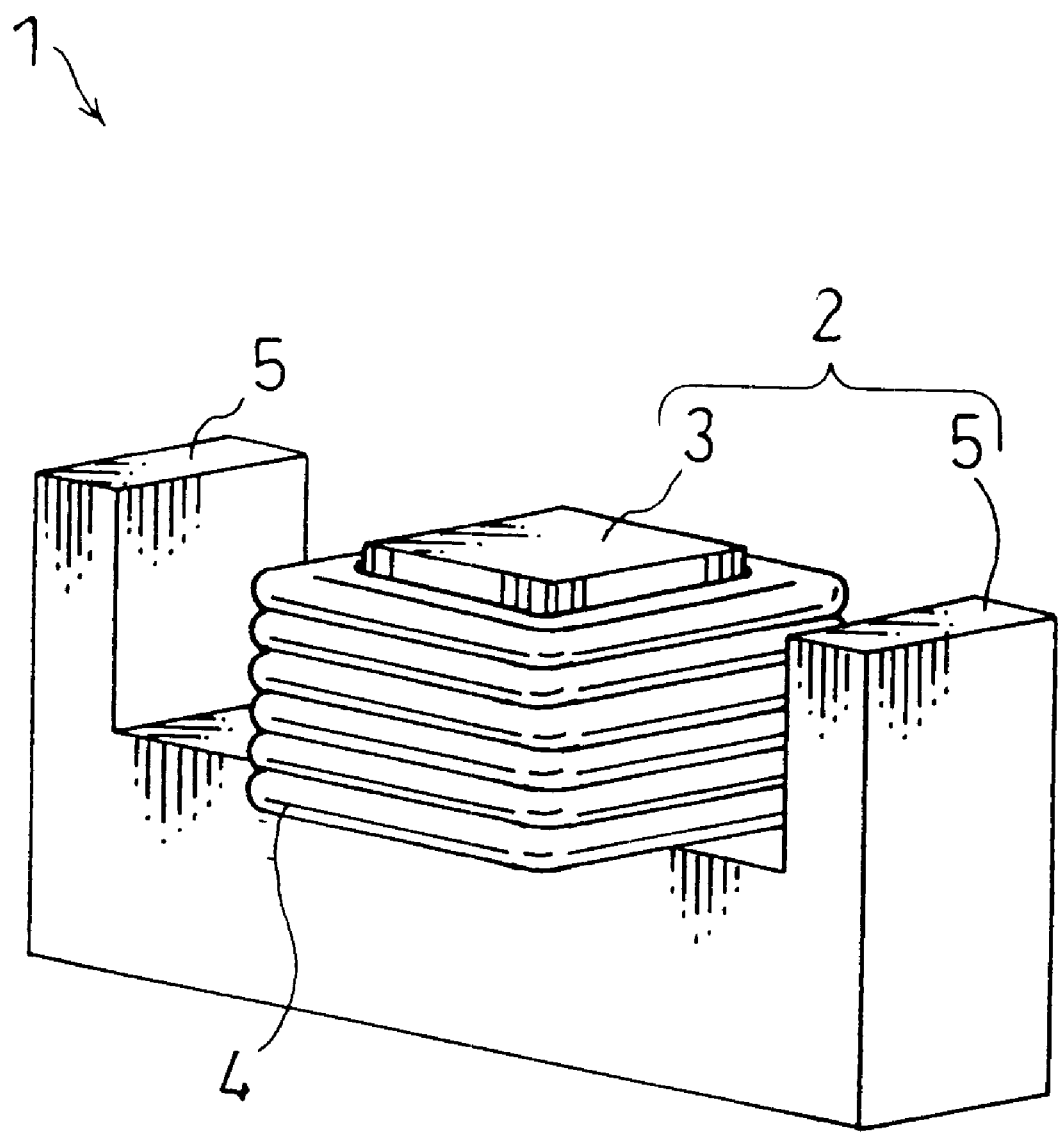
FIG. 8 is a perspective view showing a structure of a typical conventional magnetic head.

FIG. 1 is a perspective view showing a structure of a magnetic head 51 of one embodiment of the present invention. The magnetic head 51 has a magnetic core 52 having an improved magnetic field generating efficiency than the conventional E-shape core 2 shown in FIG. 8, thus suppressing the calorific value and improving the heat radiation effect. Therefore, given the magnetic field of the same strength, the calorific value can be decreased compared with the magnetic head 1 of the E-shape core 2, so as to increase the frequency of the current flown through the coil, thus adapting to high-frequency recording.

In order to exhibit the foregoing effect, the magnetic core 52 has a raised structure wherein a magnetic body 54 in the form of a flat plate is attached to one end of a magnetic pole 53 in the form of a circular pillar or rectangular pillar (rectangular pillar in FIG. 1). Around the magnetic pole 53 is a coil 55.

It should be noted that, in the present invention, the magnetic body 54 has a shape which is asymmetrical about a relative displacement direction of the recording medium in a recording and reproducing operation, as indicated by the arrow 56, with respect to the portion where the magnetic pole 53 is attached. That is, the magnetic pole 53 is provided by being offset to one side from the center of the magnetic body 54 in the moving direction of the magnetic head 51 relative to the recording medium. In other words, the magnetic core 52 is asymmetrical about a direction perpendicular to the moving direction of the magnetic head 51. In the example of FIG. 1, an end portion 54a on the outer side in the radial direction of the recording medium is substantially in line with an outer end portion of the coil 55 in the radial direction. That is, in the example of FIG. 1, compared with the example of FIG. 12, an end portion of the magnetic body 54, as indicated by the reference numeral 54c, on the outer side of the radial direction has been removed.

The recordable area by the magnetic head is determined by the larger of the distance from the center of the magnetic pole 53 to an end surface of the magnetic core 52 and the distance from the center of the magnetic pole 53 to the outer end portion of the coil 55 in the radial direction. Meanwhile, the magnetic body 54, which is provided to improve the magnetic field generating efficiency, creates a stronger perpendicular magnetic field over the recording medium with a larger surface, yet no significant reduction in magnetic field strength occurs even when the magnetic body 54 is substantially in line with the outer end portion of the coil 55 in the radial direction. According to a simulation of the magnetic field by the inventors of the present invention, while the strength of the magnetic field was, for example, 21 [kA/m] when the magnetic body 54 was made sufficiently larger to extend over the outer end portion of the coil 55 in the radial direction as in the example of FIG. 12, the strength of the magnetic field was 20 [kA/m] even when the magnetic body 54 was substantially in line with the outer end portion of the coil 55 in the radial direction.

Thus, the reduction in magnetic field strength is around 5 [%] and poses no serious problem even when the end portion 54a is substantially in line with the outer end portion of the coil 55 in the radial direction. As will be described later, the present invention enables using the entire area of the recordable area of the recording medium by increasing the recordable area outward in the radial direction while minimizing a reduction in magnetic field generating efficiency.

Figure 2:
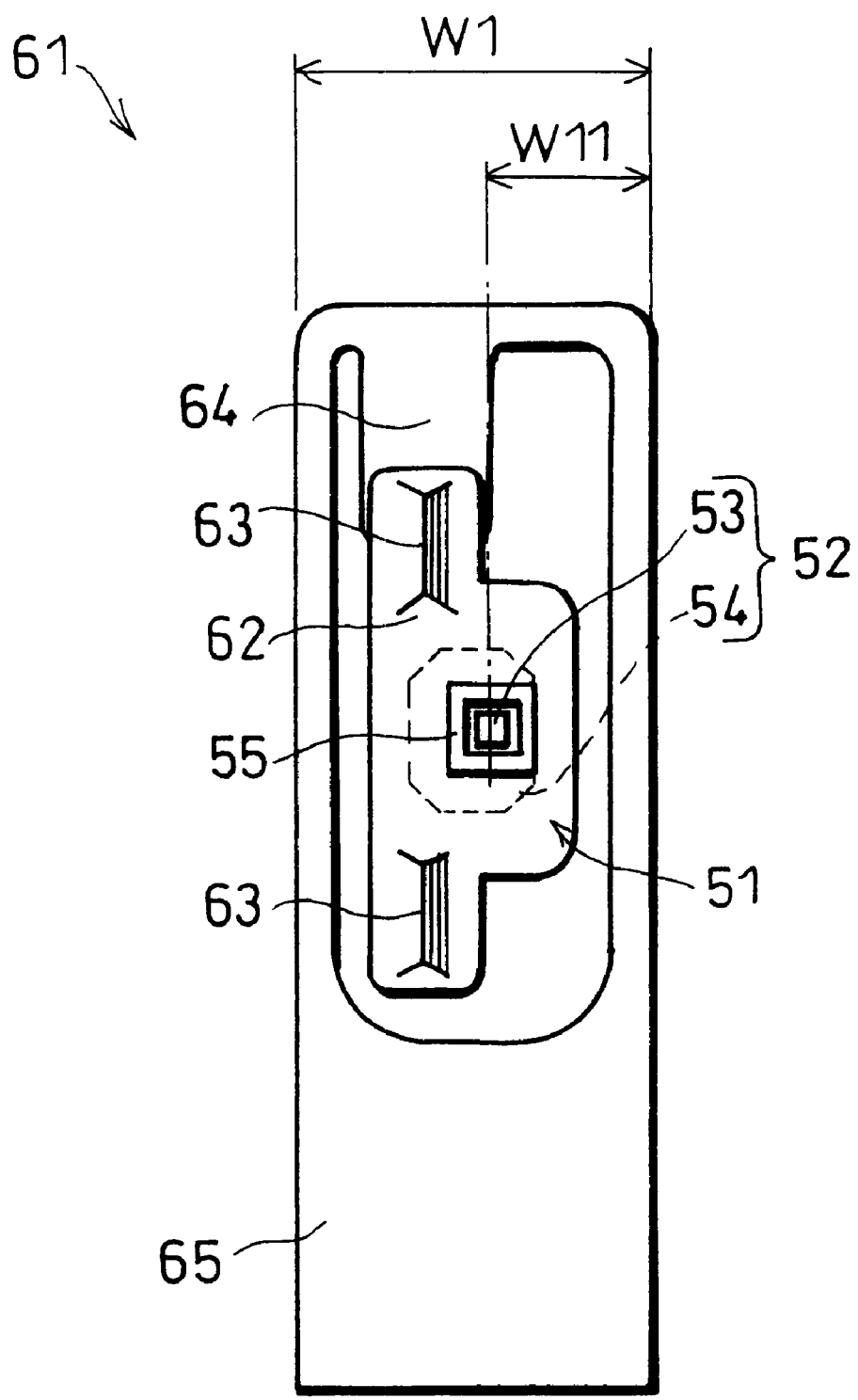
FIG. 2 is a drawing showing a magnetic head assembly employing the magnetic head of FIG. 1, as viewed from the recording medium side.

FIG. 2 shows a magnetic head assembly 61 which employs the foregoing magnetic core 52 of the raised shape, as viewed from the recording medium side. The magnetic head 51 is attached to a slider 62 made from a slidable material. The slider 62 has a sliding part 63 which slides on the recording medium and holds the magnetic head 51, and is attached to one end of a suspension 65 (mentioned later) by a link portion 64. The sliding part 63 is provided on one side or both sides of the magnetic head 51 (both sides in FIG. 2) with respect to a direction orthogonal to the sliding direction relative to the recording medium.

The sliding part 63 is made of, for example, a polymer material such as polyarylate, nylon, and polyester, or a material having a low friction coefficient such as ceramic, using a mold. Alternatively, the sliding part 63 may be made of other materials, and a material having a low friction coefficient in the form of a tape may be stuck to a portion which comes into contact with the recording medium.

The magnetic head 51 and the slider 62 are slidable in response to deflection of the recording medium, or dusts or protrusions, etc., on the recording medium. Thus, the magnetic head 51 and the slider 62 are normally supported under a pre-load of 3 mN to 10 mN by the suspension 65 made of thin metal having a thickness in a range of 30 $\mu$m to 100 $\mu$m. The other end of the suspension 65 is supported by a fixing section.

In addition to the magnetic head 51, the slider 62, and the suspension 65, there is provided an upper regulating plate (not shown) to make up the magnetic head assembly 61. The upper regulating plate is provided to prevent any damage to the magnetic head 51, which may be caused by a collision between the magnetic head 51 and the outer casing, for example, due to vibrations experienced by the entire device, or between the magnetic head 51 and the recording medium due to reaction to such vibrations.

Figure 3:
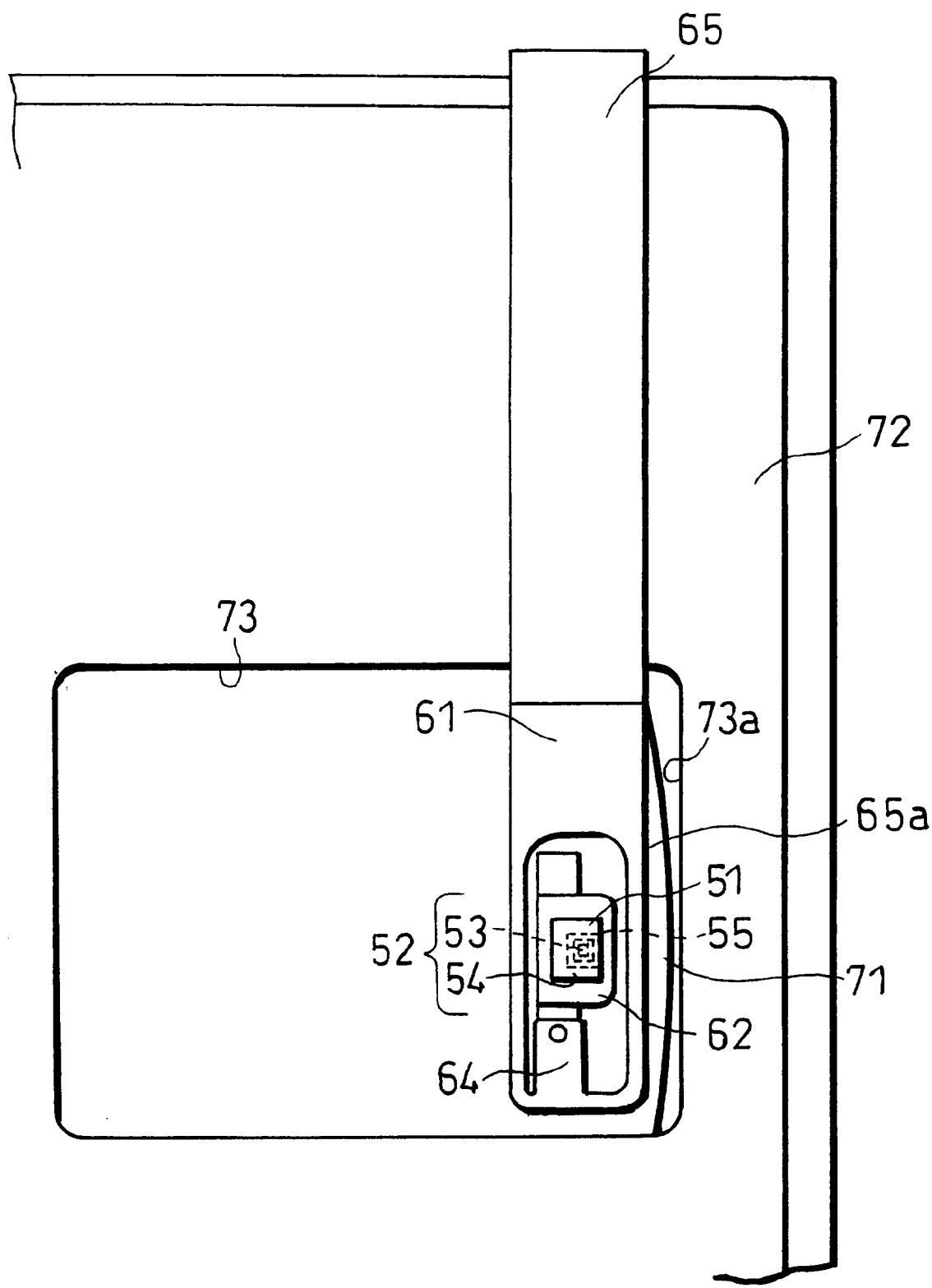
FIG. 3 is a plan view explaining how recording is carried out by the magnetic head assembly of FIG. 2.
Figure 4:
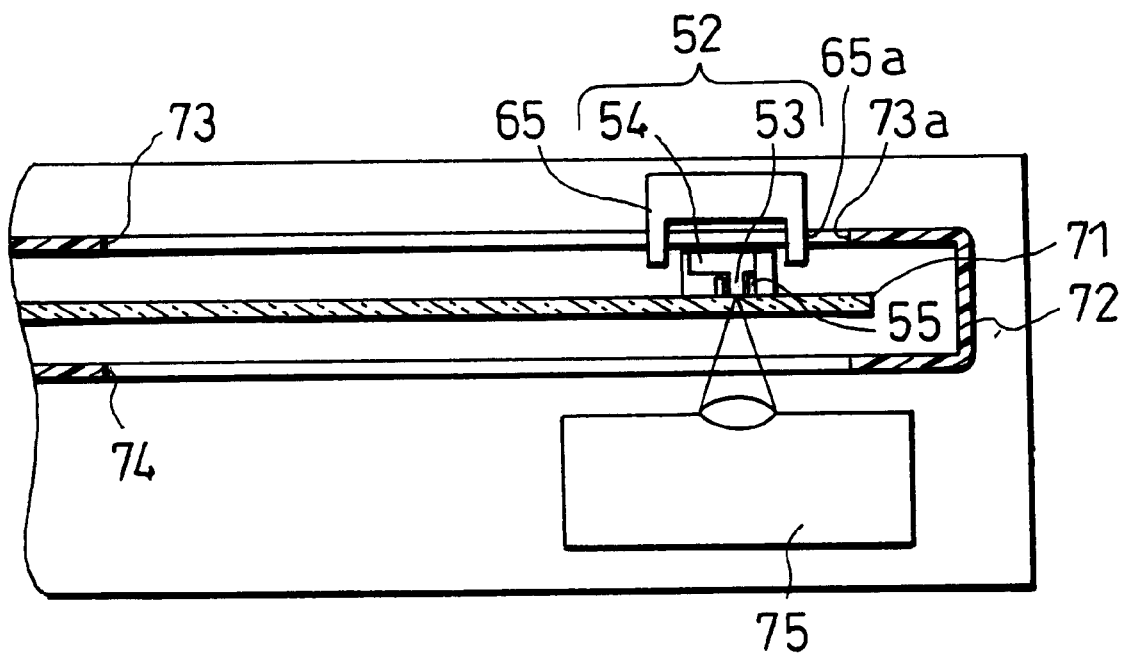
FIG. 4 is a cross sectional view explaining how recording is carried out by the magnetic head assembly of FIG. 2.

FIG. 3 and FIG. 4 are a plan view and a cross sectional view, respectively, explaining how recording is carried out by the magnetic head assembly 61. A recording medium 71 is encased in a cartridge 72 for protection against damage or dusts. The cartridge 72 has openings 73 and 74 of a near-rectangular shape respectively on the upper and lower sides thereof. The openings 73 and 74 are closed by a shutter (not shown) when the cartridge 72 is out of the device.

When recording, a front end of the magnetic head 61 moves into the cartridge 72 from the opening 73, and the sliding part 63 of the slider 62 comes into contact with the recording medium 71. As explained, MDs employ magnetic modulation recording, and thus there is provided a light pick-up 75 which is directed to the recording medium 71 through the opening 74, on the opposite side of the magnetic head 51 with the magnetic medium 71 in between. The light pick-up 75 is displaceable in the radial direction of the recording medium 71 in an interlocked manner with the magnetic head 51. A portion irradiated with a laser beam from the light pick-up 75 becomes a recording site. Signals are recorded only on the recording site by the modulation magnetic field applied in the vicinity of the recording site by the magnetic head 51.

In the magnetic head assembly 61 having the described structure, in the present invention, the magnetic head 51 employs the magnetic core 52 of the raised shape. Thus, as shown in FIG. 2, the width W1 of the magnetic head assembly 61 in the radial direction of the recording medium 71 is wider than the width w2 of the magnetic head assembly 11 as shown in FIG. 9. However, unlike the magnetic head 41 of FIG. 13, a portion of the magnetic body 54 on the outer side of the radial direction is removed. Thus, the distance W11 from the center of the magnetic pole 53 to a side surface 65a of the suspension 65 on the outer side of the radial direction can be made shorter than the distance w11 of the magnetic head 41 and substantially the same as the distance w12 of the magnetic head 1.

Therefore, even when the magnetic head assembly 61 is moved outward in the radial direction of the recording medium 71 by the same displacement as the magnetic head assembly 11, a peripheral wall portion 73a of the opening 73 does not interfere with the side surface 65a of the suspension 65. Thus, even when the magnetic head 51 is made compatible with high frequencies, by determining the shape of the magnetic body 54 in accordance with the cartridge 72 encasing the recording medium 71, or the mechanical components in the recording device in the vicinity of the magnetic head 51, the recording area of the recording medium 71 can be used to its full extent by increasing the recordable area toward the outer periphery of the recording medium 71 where a recording capacity per unit rotation angle is large, as described above.

Figure 5:
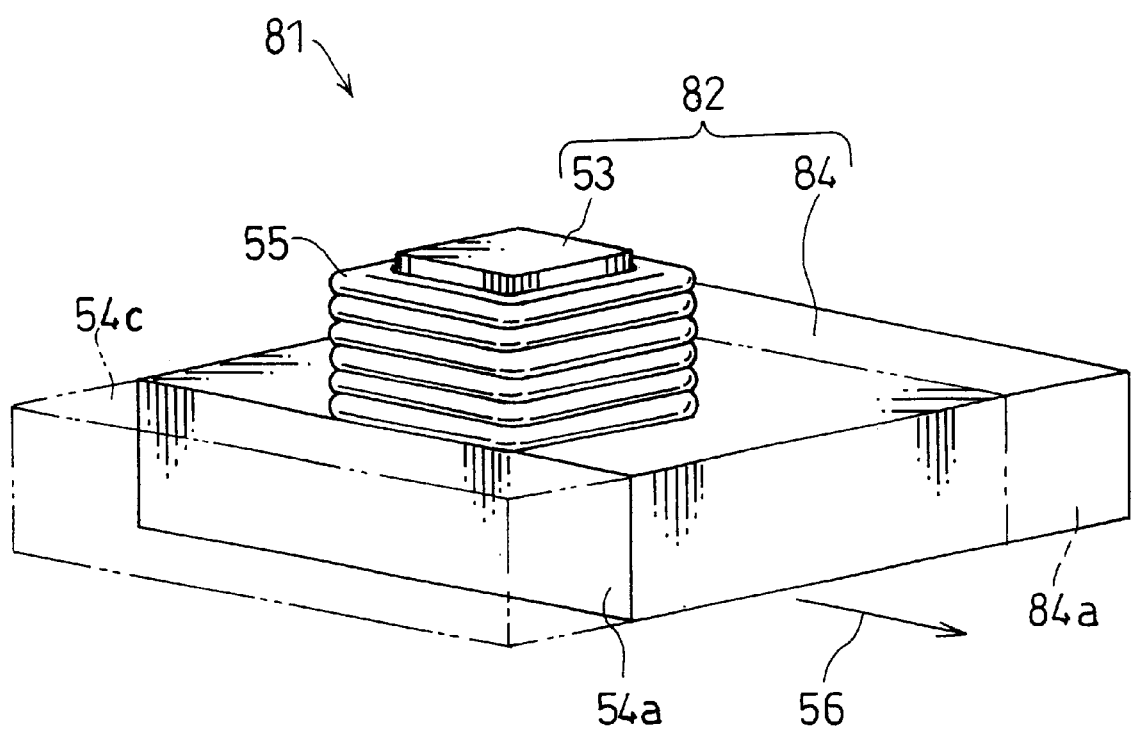
FIG. 5 is a perspective view showing a structure of a magnetic head in accordance with another embodiment of the present invention.

The following will describe another embodiment of the present invention with reference to FIG. 5.

FIG. 5 is a perspective view showing a structure of a magnetic head 81 in accordance with another embodiment of the present invention. The magnetic head 81 is similar to the foregoing magnetic head 51, and corresponding elements are given the same reference numerals and explanations thereof are omitted here. It should be noted that, unlike the magnetic head 51 having the magnetic body 54 from which the portion indicated by the reference numeral 54c on the outer side of the radial direction has been removed, the magnetic head 81 has a magnetic core 82 which has an additional portion as indicated by the reference numeral 84a on the inner side of the radial direction to ensure the same heat capacity and the same heat radiation area as with the magnetic core 32 shown in FIG. 12.

As a result, the magnetic core 82 of a raised shape can have the same heat capacity and the same heat radiation area as the magnetic core 32 of the raised shape.

Figure 6:
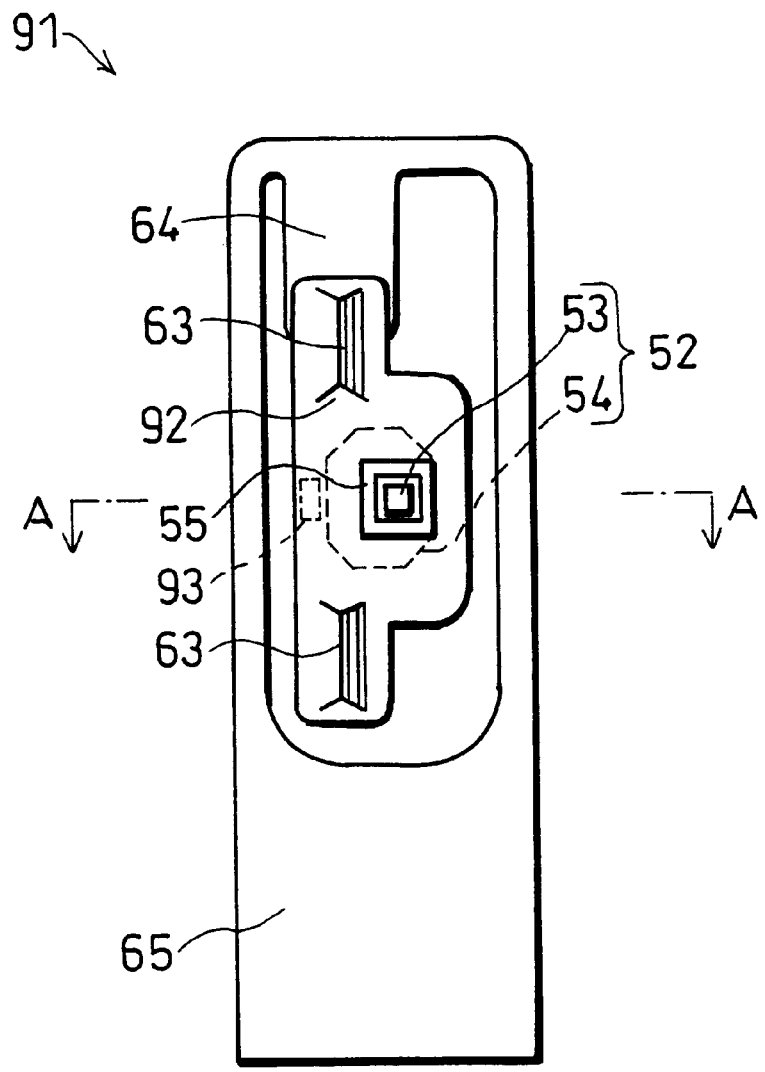
FIG. 6 is a drawing showing a magnetic head assembly in accordance with yet another embodiment of the present invention, as viewed from the recording medium side.
Figure 7:
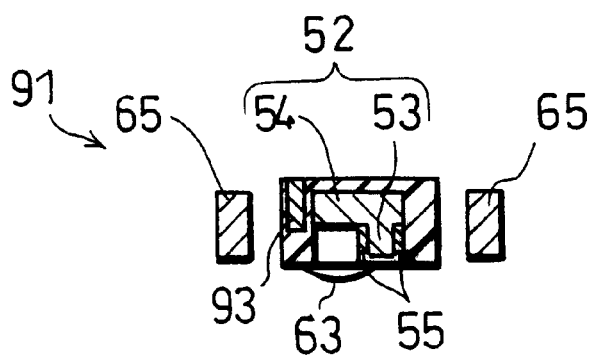
FIG. 7 is a cross sectional view of FIG. 6 taken along the line A—A.

The following will describe yet another embodiment of the present invention with reference to FIG. 6 and FIG. 7.

FIG. 6 shows a magnetic head assembly 91 of yet another embodiment of the present invention as viewed from the recording medium side, and FIG. 7 is a cross sectional view of FIG. 6 taken along the line A—A. The magnetic head assembly 91 is similar to the magnetic head assembly 61, and corresponding elements are given the same reference numerals and explanations thereof are omitted here. It should be noted that the magnetic head assembly 91 has a magnetic body 54 which is asymmetrical with respect to a slider 92 which holds the magnetic head 51, and in order to cancel out the resulting eccentricity of the center of gravity off the sliding part 63 in a direction orthogonal to the sliding direction of the slider 92 with respect to the recording medium, the slider 92 has a weight 93 therein.

To explain in more detail, the slider 92 is made of a material such as resin, whereas the magnetic core 52 is made of a material such as ferrite. Thus, when the magnetic body 54 is asymmetrical as above, due to the difference in density between the magnetic core 52 and the slider 92, the center of gravity in a direction orthogonal to the sliding direction of the slider 92 (on the plane of the cross section of FIG. 7) with respect to the recording medium is offset from the sliding part 63, and as a result sliding stability suffers. Especially, when the sliding part 63 has a curvature, and a portion of the sliding part 63 which comes into contact with the recording medium is in the form of a line or a narrow flat plate, the movement of the magnetic head 51 becomes unstable if the center of gravity of the slider 92 is not on the sliding part 63.

In order to solve this problem, to the slider 92 is fitted the weight 93 which is made of a material, for example, such as a stainless steel plate, having a larger density than the slider 92. The weight 93 may alternatively be provided separately to the slider 92 if there is a space available on the slider 92 on the opposite side of the recording medium. For example, the weight of the recording core 52, the coil 55, and the slider 92 combined together is about 100 mg, whereas the weight 93 weighs several ten milligrams.

Therefore, even when the recording medium experiences large deflection or shock, because the weight is balanced, the recording medium does not collide with any other parts of the device except the sliding part 63. Further, designing of the suspension becomes easier since the load balance does not need to be taken into consideration.

In the foregoing explanation, the magnetic head assembly 91 employed the magnetic head 51, which, obviously, may be the magnetic head 81 instead.

Note that, Japanese patent publication No. 2936782 (publication date: Nov. 13, 1992) teaches a disposition wherein the side surface of the slider on the outer periphery of the magneto-optical disk is cut out so as to offset the center of the magnetic head section from the center of the slider. However, this patent publication does not use a magnetic core like the magnetic cores 52 and 82 of the raised shape of the present invention, and thus would not have realized the special arrangement of the present invention wherein the magnetic bodies 54 and 84 of the magnetic cores 52 and 82 of the raised shape are made asymmetrical about the relative displacement direction of the recording medium as indicated by the arrow 65, with respect to the portion where the magnetic pole 53 is attached.

As described, the magnetic head of the present invention may be adapted to have an arrangement wherein the recording medium is in the form of a disk and encased in a cartridge, and an end portion of the magnetic body on the outer side in a radial direction of the recording medium is substantially in line with the outer end portion of the coil in the radial direction.

With this arrangement, the end portion on the outer side in the radial direction of the recording medium is made substantially in line with the outer end portion of the coil in the radial direction, taking advantage of the fact that the strength of the magnetic field at the recording site does not become overly weak irrespective of whether the magnetic body in the form of a flat plate, which is provided at an end of the magnetic pole to improve the magnetic field generating efficiency, is substantially in line with the outer end portion of the coil in the radial direction, or extending beyond it.

Thus, even when the recording medium is used to its outermost periphery, the peripheral wall portion of the opening of the cartridge for the magnetic head does not interfere with the magnetic head, thereby making it possible to use the outer peripheral side of the recording medium to its full extent, where the recording capacity per unit rotation angle is large. Meanwhile, because the distance from the center of the magnetic pole to the end portion on the inner side in the radial direction of the recording medium is made larger than the distance to the outer end portion of the coil in the radial direction, a required heat capacity for the magnetic core composed of the magnetic pole and the magnetic body is ensured. Further, it is ensured that the temperature of the magnetic core does not increase more than the Curie temperature, and the heat radiation area required for the magnetic body is provided, and thus the problem of heat radiation is not caused.

Further, the magnetic head of the present invention is for applying a magnetic field for recording and erasing information to a temperature-increased recording site of a recording medium, and includes: a magnetic pole in the form of a pillar; a coil which is wound around the magnetic pole; and a magnetic body in the form of a flat plate, to which one end of the magnetic pole is attached, and which is formed asymmetrical about a relative displacement direction of the recording medium with respect to a portion where the magnetic pole is attached.

With this arrangement, using the magnetic core of a raised shape which is composed of the pillar-shaped magnetic pole being attached to the magnetic body in the form of a flat plate, the magnetic head is arranged so that the magnetic body is asymmetrical about the relative displacement direction of the recording medium, so as to adapt to high frequencies by way of providing a heat capacity required for the magnetic core and a heat radiation area required for the magnetic body.

Thus, by determining the shape of the magnetic body in accordance with the cartridge which encases the recording medium, or the mechanical components in the vicinity of the magnetic head, there will be no interference between the magnetic head and the cartridge or the mechanical components, even when the size of the magnetic core is increased due to the magnetic core of the raised shape. As a result, there will be less restriction on the moving range of the magnetic head, thus making it possible to use the entire recording area of the recording medium.

Also, since the heat capacity and the heat radiation area required for the magnetic core are provided by the asymmetrical configuration where there is no interference, there will be no problem due to heat capacity and heat radiation area.

Further, the magnetic head assembly of the present invention preferably includes the suspension on which the magnetic head is fastened, wherein the distance from the center of the magnetic pole to the side surface of the suspension on the outer side in the radial direction of the recording medium is shorter than the distance from the center of the magnetic pole to the side surface of the suspension on the inner side of the radial direction of the recording medium.

The magnetic head of the present invention employs the magnetic core of a raised shape, and therefore the width in the radial direction of the recording medium of the magnetic head assembly is wider than the width of the magnetic head assembly of the E-shape magnetic head assembly. However, because the magnetic pole is provided by being offset outward in the radial direction of the magnetic body, the distance from the center of the magnetic pole to the side surface of the suspension on the outer side in the radial direction can be made shorter than the distance from the center of the magnetic pole to the side surface of the suspension on the inner side in the radial direction of the recording medium, and substantially the same as the distance of the conventional E-shape magnetic head.

Thus, the peripheral wall portion of the opening of the cartridge encasing the recording medium does not interfere with the side surface of the suspension even when the magnetic head assembly of the present invention is moved outward in the radial direction of the recording medium by the same displacement as in the conventional magnetic head assembly. Therefore, even in the structure where the magnetic head of the present invention is made compatible with high frequencies and the magnetic body in the form of a flat plate is provided, by determining the shape of the magnetic body in accordance with the cartridge encasing the recording medium or the mechanical components in the device in the vicinity of the magnetic head, the recordable area can be increased toward the outer periphery of the recording medium where the recording capacity per unit rotation angle is large, thereby using the entire recording area of the recording medium.

Further, the magnetic head assembly of the present invention preferably has an arrangement wherein the sliding part of the slider slides on the recording medium alone or in pair in a direction orthogonal to the sliding direction with respect to the recording medium and holds the magnetic head, and the slider includes therein a weight for cancelling out the eccentricity of the center of gravity due to the asymmetrical configuration of the magnetic body.

Further, it is preferable to have an arrangement which includes a slider having a sliding part which comes into contact with a surface of the recording medium and is provided at one or two locations in a direction orthogonal to a relative moving direction of the magnetic head with respect to the recording medium, wherein the slider is slidable on the surface of the recording medium by the sliding part, and is provided with a weight for cancelling out eccentricity of center of gravity of the entire slider including the magnetic core and the coil, due to the asymmetrical configuration of the magnetic body.

As a result, the slider can slide stably.

Note that, the present invention may alternatively have an arrangement wherein the magnetic head for applying a magnetic field for recording and erasing information to a temperature-increased recording site of the recording medium includes a magnetic pole in the form of a pillar, a coil which is wound around the magnetic pole, and a magnetic body in the form of a flat plate, to which one end of the magnetic pole is fastened, and which is formed asymmetrical about a relative displacement direction of the recording medium with respect to a portion where the magnetic pole is fastened.

Further, the present invention may alternatively have the magnetic head which is adapted to have an arrangement wherein the recording medium is in the form of a disk and encased in a cartridge, and the magnetic body is formed so that an outer portion thereof on the outer side in the radial direction of the recording medium is substantially in line with the outer end portion of the coil in the radial direction of the recording medium.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A magnetic head for applying a magnetic field for recording and erasing information to a temperature-increased recording site of a recording medium, comprising:

a magnetic pole in the form of a pillar;

a coil which is wound around the magnetic pole; and a magnetic body in the form of a flat plate to which one end of the magnetic pole is fastened, said magnetic body being formed asymmetrical about a relative displacement direction of the recording medium with respect to a portion where the magnetic pole is fastened.

2. The magnetic head as set forth in claim 1, wherein:

the recording medium is in the form of a disk and encased in a cartridge, and an end portion of the magnetic body on an outer side in a radial direction of the recording medium is substantially in line with an outer end portion of the coil in the radial direction.

3. A magnetic head assembly having the magnetic head of claim 1, comprising:

a slider having a sliding part which comes into contact with a surface of the recording medium and is provided at one or two locations in a direction orthogonal to the relative moving direction of the magnetic head with respect to the recording medium, said slider being slidable on the surface of the recording medium by the sliding part, and being provided with a weight for cancelling out eccentricity of center of gravity due to the asymmetrical configuration of the magnetic body.

4. The magnetic head assembly as set forth in claim 3, comprising a suspension on which the magnetic head is fastened, wherein a distance from a center of the magnetic head to a side surface of the suspension on an outer side in the radial direction of the recording medium is shorter than a distance from a center of the magnetic pole to a side surface of the suspension on an inner side in the radial direction of the recording medium.

* * * * *